United States Patent [19]
Cashman et al.

[11] Patent Number: 6,032,253
[45] Date of Patent: Feb. 29, 2000

[54] DATA PROCESSOR WITH MULTIPLE COMPARE EXTENSION INSTRUCTION

[75] Inventors: John D. Cashman, Boxborough, Mass.; Paul M. Riley, Nashua, N.H.; Raymond G. Bahr, Natick; Wei Ye, Westford, both of Mass.

[73] Assignee: Cisco Technology, Inc., San Jose, Calif.

[21] Appl. No.: 09/188,624

[22] Filed: Nov. 9, 1998

Related U.S. Application Data

[63] Continuation of application No. 09/132,621, Aug. 11, 1998.
[60] Provisional application No. 60/089,248, Jun. 15, 1998.

[51] Int. Cl.[7] .................................................. G06F 7/06
[52] U.S. Cl. ........................................ 712/300; 710/105
[58] Field of Search .......................... 709/236; 710/105; 708/203; 712/300

[56] References Cited

U.S. PATENT DOCUMENTS

| 5,394,394 | 2/1995 | Crowther et al. .......................... 370/60 |
| 5,598,410 | 1/1997 | Stone ....................................... 370/469 |

OTHER PUBLICATIONS

Data Sheet 7711 "Encryption Processor," Hi/fn, Inc., San Jose, CA, PRS–056 Revision 1.01 (1998).
Data Sheet 9711 "Data Compression Coprocessor," Hi/fn, Inc., San Jose, CA, PRS–0053 Revision 1.1 (Aug. 1997).

*Primary Examiner*—John A. Follansbee
*Attorney, Agent, or Firm*—Hamilton, Brook, Smith & Reynolds, P.C.

[57] ABSTRACT

A programmable data communications device is provided to process multiple streams of data according to multiple protocols. The device is equipped with a co-processor including multiple, programmable processors allowing data to be operated on by multiple protocols. The programmable processors within the co-processor include extended instruction sets including instructions providing the operations of zero stuffing, CRC computation, partial compare, conditional move, and trie traversal. These instructions allow the processor(s) of the co-processor to more efficiently execute programs implementing data communications protocols. Since each processor is programmable, protocols standards which change may be accommodated. A network device equipped with the co-processor can handle multiple simultaneous streams of data and can implement multiple protocols on each data stream. The protocols can execute within the co-processor either independently of each other, or in conjunction with each other.

11 Claims, 16 Drawing Sheets

MULTIPLE COMPARE

STATUS REGISTER - 508

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Z | N | C | V | | E | | H | R | | | | | | | | | | | | | | | | PC | | | | | | | |

| FIELD | RESET | ACTIVE STATE | R/W | DESCRIPTION |
|---|---|---|---|---|
| Z | 0x00 | H | R/W | ZERO CONDITION CODE |
| N | 0x00 | H | R/W | NEGATIVE CONDITION CODE |
| C | 0x00 | H | R/W | CARRY CONDITION CODE |
| V | 0x00 | H | R/W | OVERFLOW CONDITION CODE |
| E | 0x00 | H | R/W | INTERRUPT MASK |
| H | 0x00 | H | R/W | HALT |
| R | x | H | R/W | RESERVED |
| PC | 0x000000 | H | R/W | PROGRAM COUNTER |

FIG. 4

EXTENSION REGISTER – ZERO STUFF OVERFLOW ACCUMULATION REGISTER (ZSE) – 510

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | | | EXPANSION | | | | | | | | | | | | | | | |

| FIELD | RESET | ACTIVE STATE | R/W | DESCRIPTION |
|---|---|---|---|---|
| EXPANSION | 0x00000000 | | | THESE BITS STORE THE BITS WHICH EXPAND PAST THE 32 INPUT BITS BECAUSE OF ZERO INSERTION DURING THE ZERO STUFFING INSTRUCTION. WHEN THIS FIELD FILLS, AN OVERFLOW CONDITION IS GENERATED. ON AN OVERFLOW, THIS FIELD IS FILLED WITH DATA AND MUST BE READ BY THE ARC AND STORED WITH THE ZERO STUFFED DATA FOLLOWING THE RESULT OF THE ZERO STUFFING INSTRUCTION WHICH GENERATED THE OVERFLOW CONDITION. THE REGISTER IS LOADED WITH OVERFLOW BITS FROM THE ZERO STUFF CONTROL REGISTER WHEN READ. |

FIG. 5

| EXTENSION REGISTER – ZERO STUFF OVERFLOW DATA REGISTER (ZSread) – 512 | | | |
|---|---|---|---|
| 31\|30\|29\|28\|27\|26\|25\|24\|23\|22\|21\|20\|19\|18\|17\|16\|15\|14\|13\|12\|11\|10\|9\|8\|7\|6\|5\|4\|3\|2\|1\|0 | | | |
| EXPANSION | | | |
| FIELD | RESET | ACTIVE STATE | R/W | DESCRIPTION |
|---|---|---|---|---|
| EXPANSION | 0x00000000 | H | R/W | THESE BITS STORE THE ZERO STUFFED OVERFLOW ACCUMULATED DATA. THIS REGISTER IS UPDATED DURING A ZERO STUFFING OPERATION WHEN THE ZSE REGISTER OVERFLOWS. THE DATA STORED IN THIS REGISTER IS THE ZSE REGISTER DATA WHICH HAS BEEN ZERO STUFFED. |

FIG. 6

EXTENSION REGISTER – ZERO STUFF STATE (ZSS) – 514

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| UNUSED | | | | | | | | | PREV_MSBS | | | | | STATE | | | | | | | | OVERFLOW | | | | | | | | | |

| FIELD | RESET | ACTIVE STATE | R/W | DESCRIPTION |
|---|---|---|---|---|
| OVERFLOW | 0x00 | H | R/W | UP TO ELEVEN BITS MAY OVERFLOW THE EXPANSION FIELD BECAUSE OF ZERO STUFFING. THESE BITS ARE STORED IN OVERFLOW. WHEN THE ZSE REGISTER IS READ, THE DATA IN OVERFLOW IS COPIED INTO THE EXPANSION REGISTER AND THE STATE FIELD IS UPDATED. |
| STATE | 0x00 | H | R/W | THIS FIELD MAINTAINS THE SUM OF THE NUMBER OF BITS WHICH ARE STORED IN THE EXPANSION FIELD AND THE OVERFLOW FIELD. THIS FIELD IS USED WHEN PERFORMING A ZERO STUFF INSTRUCTION. |
| PREV_MSBS | 0x00 | H | R/W | THIS FIELD CONTAINS THE PREVIOUS 5 MOST SIGNIFICANT BITS OF THE PREVIOUS RESULT. |

FIG. 7

EXTENSION REGISTER – PPP CHARACTER CONTROL REGISTER - 516

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| UNUSED | | | | | | | | | | | | | | | V2 | V1 | CHARACTER 2 | | | | | | | CHARACTER 1 | | | | | | | |

| FIELD | RESET | ACTIVE STATE | R/W | DESCRIPTION |
|---|---|---|---|---|
| CHARACTER 1 | 0x00 | H | R/W | CONTAINS ONE OF THE CHARACTERS TO BE COMPARED AGAINST WHEN THE MULTIPLE COMPARE INSTRUCTION IS ISSUED |
| CHARACTER 2 | 0x00 | H | R/W | CONTAINS ONE OF THE CHARACTERS TO BE COMPARED AGAINST WHEN THE MULTIPLE COMPARE INSTRUCTION IS ISSUED |
| V1 | 0x00 | H | R/W | THIS FIELD VALIDATES CHARACTER 1. IF SET, THEN THE COMPARISON IS MADE. IF THIS FIELD IS NOT SET, NO CPMPARISON IS MADE REGARDLESS OF DATA LOADED INTO CHARACTER 1. |
| V2 | 0x00 | H | R/W | THIS FIELD VALIDATES CHARACTER 2. IF SET, THEN THE COMPARISON IS MADE. IF THIS FIELD IS NOT SET, NO CPMPARISON IS MADE REGARDLESS OF DATA LOADED INTO CHARACTER 2. |

FIG. 8

| EXTENSION REGISTER – CRC POLYNOMIAL – 518 | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| UNUSED | | | | | | | | | | | | | | | | X15 | X14 | X13 | X12 | X11 | X10 | X9 | X8 | X7 | X6 | X5 | X4 | X3 | X2 | X1 | 0 |

| FIELD | RESET | ACTIVE STATE | R/W | DESCRIPTION |
|---|---|---|---|---|
| X15 | 0x0 | H | R/W | CRC POLYNOMIAL COEFFICIENT OF TERM $X^{15}$. |
| X14 | 0x0 | H | R/W | CRC POLYNOMIAL COEFFICIENT OF TERM $X^{14}$. |
| X13 | 0x0 | H | R/W | CRC POLYNOMIAL COEFFICIENT OF TERM $X^{13}$. |
| X12 | 0x0 | H | R/W | CRC POLYNOMIAL COEFFICIENT OF TERM $X^{12}$. |
| X11 | 0x0 | H | R/W | CRC POLYNOMIAL COEFFICIENT OF TERM $X^{11}$. |
| X10 | 0x0 | H | R/W | CRC POLYNOMIAL COEFFICIENT OF TERM $X^{10}$. |
| X9 | 0x0 | H | R/W | CRC POLYNOMIAL COEFFICIENT OF TERM $X^{9}$. |
| X8 | 0x0 | H | R/W | CRC POLYNOMIAL COEFFICIENT OF TERM $X^{8}$. |
| X7 | 0x0 | H | R/W | CRC POLYNOMIAL COEFFICIENT OF TERM $X^{7}$. |
| X6 | 0x0 | H | R/W | CRC POLYNOMIAL COEFFICIENT OF TERM $X^{6}$. |
| X5 | 0x0 | H | R/W | CRC POLYNOMIAL COEFFICIENT OF TERM $X^{5}$. |
| X4 | 0x0 | H | R/W | CRC POLYNOMIAL COEFFICIENT OF TERM $X^{4}$. |
| X3 | 0x0 | H | R/W | CRC POLYNOMIAL COEFFICIENT OF TERM $X^{3}$. |
| X2 | 0x0 | H | R/W | CRC POLYNOMIAL COEFFICIENT OF TERM $X^{2}$. |
| X1 | 0x1 | H | R/W | CRC POLYNOMIAL COEFFICIENT OF TERM $X^{1}$. |

FIG. 9

PARTIAL SUBTRACTION AND CONDITIONAL MOVE

PARTIAL COMPARE AND CONDITIONAL MOVE

DATA PROCESSOR WITH MULTIPLE COMPARE EXTENSION INSTRUCTION

RELATED APPLICATION(S)

This application is a continuation of application Ser. No. 09/132,621 filed Aug. 11, 1998, which claims the benefit of U.S. Provisional Application No. 60/089,248, filed Jun. 15, 1998, the contents of which are incorporated herein by reference in their entirety.

FIELD OF THE INVENTION

The present invention relates to data communications devices and more specifically to network devices which implement protocols to operate on data in a data communications system.

BACKGROUND OF THE INVENTION

In digital communications systems, data is routinely transmitted between many processing devices over a network. For example, in computer networks such as the Internet, data is typically sent from one computer to another through network communications devices such as modems, hubs, routers, bridges, switches and/or other computers interconnected by transmission media or data links. The data itself is stored and communicated as a series of binary digits (bits) represented by zeros and ones. During data communications, the manner in which the bits of data are specifically arranged and the order in which they are exchanged between devices is called a protocol. Protocols are usually established by industry standards. There are many different types of protocols serving different purposes, but each typically involves a sending device that arranges data in one manner, and a receiving device that detects the specific arrangement of the data in order to make use of the data upon reception.

For example, blocks of data can be reduced in size by compression protocols before transmission from a sending computer in order to conserve bandwidth. When privacy is desired, data can be altered by encryption protocols into a state that makes the data unreadable by anyone or any device not authorized to read the data. The data can travel across the network in an encrypted and compressed state until it reaches its destination. Upon receipt, the receiving computer decrypts (i.e. decodes) and decompresses the data according to these protocols into a form useable by an intended application.

In some data communications devices, the main central processing unit (CPU) of the device is responsible for performing protocols on data, such as the compression, decompression and encryption, decryption protocols noted above. In this case, the protocols are performed completely under software control by a program stored in memory. In other devices, separate dedicated hardware processors are provided to perform individual protocols. In hardware implementations, the CPU of the device merely schedules the flow of data through the device, and at the appropriate time, instructs each separate dedicated processor to perform a single respective protocol for which that dedicated processor is designed.

For instance, in a modem, as data is received from the sending application it is buffered in memory before transmission onto a computer network. The CPU in the modem assembles the data into a packet, and then compresses that packet of data. After compression, if privacy is desired, the CPU then encrypts the data packet. When the CPU has completed its task, the packet is processed further and transmitted from the modem.

An example of one type of compression/decompression protocol is called V.42bis. To compress data, V.42bis creates a dictionary of commonly occurring strings of bits in data. For a string that commonly occurs, the dictionary specifies a short replacement string which, when transmitted, takes up less space, and therefore saves network bandwidth. Compressed data according to V.42bis is stored in a data structure called a "trie". Tries are a species of multi-way search trees, designed to represent sets of character strings. To decompress data stored in a trie, a complex series of trie traversals are required to reconstruct the original data. Prior art systems perform these trie traversals in either software or with a dedicated hardware processor, as explained above.

Other protocols exist that are used to format data during data communications in order for devices to communicate effectively and efficiently. For instance, during assembly of data packets, signaling information must be provided along with the actual message data in the packets for communications to take place. Various signaling protocols have been developed to support uniform communication of data packets.

One such widely used protocol is the High Level Data Link Control ("HDLC") protocol, as defined in Level 2 of the Open Systems Interconnection ("OSI") model. HDLC is a bit-oriented protocol for sending packets between devices. HDLC requires the sender to distinguish the start and end of a packet from the actual data portion of the packet. To do so, HDLC uses a flag to indicate the start and end of packets. The flag consists of a zero bit followed by six one bits and ends with a zero bit, and appears as 01111110. In HDLC, a process called "zero stuffing" can be used to distinguish the flag portion of a packet from the data portion (which may itself contain an embedded series of ones that could be mistaken for a flag). In zero stuffing, a zero bit "0" is inserted into packet data being transmitted if five continuous one bits "11111" are detected. Thus, zero stuffing converts "11111" into "111110" in the data portion of a packet, in order to distinguish the data from the beginning and end of the packet. The receiver of the "stuffed" data packet then "unstuffs" the data by removing any zero bit following five continuous one bits (i.e., 111110 becomes 11111).

Other protocols called SLIP ("Serial Line Internet Protocol") and PPP ("Point-To-Point") are communications protocols that allow computers to simulate a direct connection to the Internet. SLIP/PPP uses special control characters that need to be detected and/or replaced in the data stream. Creation and insertion as well as detection and replacement of the control characters in prior art SLIP/PPP protocol systems is typically done with a dedicated hardware circuit processing each packet transmitted and received.

Another process occurring in data communications is called the Cyclic Redundancy Check ("CRC"). CRC is the most common method of error detection for most data communications. A CRC value is computed for a packet, attached to that packet during transmission, and upon receipt of that packet the receiver can verify the correctness of the contents of the packet by re-calculating the CRC value using the packet data and comparing the result to the attached CRC. As with the aforementioned protocols, prior art CRC computation is performed either in dedicated hardware circuitry or in software using the CPU of the device.

SUMMARY OF THE INVENTION

Currently available data communication devices that implement protocols such as compression/decompression, encryption/decryption and so forth suffer a variety of problems. Software implementations lack execution speed due to the large number of processing cycles required when executing protocols on the CPU. A CPU executing a program to compress and encrypt data must process data fast enough to fully utilize available data communications bandwidth. Fast processors are expensive and increase the cost of data communications devices. Software implementations of protocols also require a software engineer to "design" code for the protocol, which can be an error prone task.

For example, current hardware implementations of protocols are very inflexible. If the protocol changes due to evolving standards, a new chip must be created making old devices obsolete. The inflexibility of hardware solutions leads to problems when defacto protocol standards evolve that are inconsistent with a current hardware implementation. Additionally, hardware implementations may restrict future improvements in devices containing the dedicated processors because the hardware inflexibility may no longer interface to the changing functionality of the device.

The present invention overcomes the problems associated with software and hardware protocol implementations in prior art data communications devices. For simplicity herein, a data communications device that performs a protocol is called a network device. The present invention provides a network device including a unique co-processor having a symmetrical architecture and an extended processor instruction set to provide instructions allowing protocols to operate more efficiently. The network device including the co-processor off-loads the complex protocol processing tasks from the CPU in the network device.

According to one aspect of the invention, a network device used for processing data communications is provided. The network device comprises at least one input interface receiving data and at least one output interface for transmitting data. Since more than one interface may be provided, the device can handle multiple streams of data. The network device further includes memory for storing data and a system bus coupled to the input interface, the output interface, and the memory. Also coupled to the system bus is a central processing unit (CPU) which controls the receipt of data by the input interface and stores the data in memory. The network device also includes a co-processor coupled to the system bus which has at least one internal programmable processor programmed to execute multiple protocols. By executing multiple protocols in the co-processor, the CPU is free to perform other network device tasks, such as routing, for example.

In the network device, the co-processor handles retrieving the data from the memory upon an indication from the central processing unit. Then the co-processor performs each of the multiple protocols on the data for which the co-processor is programmed. Finally, the co-processor returns the data to the memory for transmission from the output interface of the network device. In this manner, the co-processor can be programmed to perform many protocols on the same data within the co-processor. This reduces the amount of transfers of the data between the main memory and CPU of the network device.

By off-loading protocol operation to the co-processor in the network device, faster data throughput rates may be achieved. One reason for this is that the co-processor can be programmed. Programmability allows the co-processor to perform multiple protocols at once, either independently of each other, or in conjunction with each other. Since only one programmed co-processor can implement multiple protocols, the system bus and CPU of the network device are free from much of the associated protocol processing.

According to another aspect of the invention, a programmable multiple-protocol co-processor apparatus for use in a data communications device is provided. Such a co-processor embodiment may be an ASIC, for example, which resides on the system bus of the network device embodiment noted above.

According to this embodiment of the invention, the co-processor includes at least one programmable processor and at least one memory system coupled to the programmable processor. An interface is coupled to the memory system and to the programmable processor. The interface can accept at least one protocol program downloaded into the memory system from a host computer processor. The host computer can be, for example, the network device noted above. The programmable processor executes the protocol program that is downloaded. If there is more than one processor executing more than one protocol program, the co-processor can execute multiple protocols. Alternatively, if one processor exists and is supplied with multiple protocol programs, the co-processor can also execute multiple protocols. The programmable aspect of the co-processors allows it to change according to changing protocols by being re-programmed.

In another embodiment, the invention provides a multi-processor embodiment of the co-processor which can quickly process data according to the program(s) which were downloaded. According to this embodiment, first and second programmable processors are coupled to respective first and second local memory systems. A bus system is coupled to the first and second programmable processors and the first and second local memory systems. The bus system has an interface capable of being connected to a host system for transferring data between the host system and the first and second programmable processors and the first and second local memory systems.

Since the co-processor is programmable and has at least one internal programmable processor, it can implement a variety of different algorithms simultaneously on many streams of data passing through the network device. The programmable nature of the co-processor also allows protocols to be easily changed by being reprogrammed if protocol standards evolve. Programmability of dual processors in the co-processor also allows flexibility in intended operation. The co-processor can thus implement multiple protocols independently of each other, or in conjunction with each other.

Specifically, according to other embodiments of the invention, the first and second programmable processors are each programmed to execute at least one protocol. Examples of protocols which may be executed are encryption, decryption, compression, decompression, HDLC framing, point-to-point protocol, serial line interface protocol, MNP5-Microcom network protocol, V.42bis. Other known data communications protocols may be programmed and implemented by the processors as needed.

The co-processor embodiments noted above rely on at least one processor to perform execution of each protocol program. That is, the co-processor contains separate individual processors therein, aside from its memory and interface systems.

These first and second programmable processors each include an extended instruction set allowing the processors to be programmed with instructions to concurrently execute multiple protocols independent of each other and allowing the processors to be programmed with instructions to concurrently execute multiple protocols in conjunction with each other.

According to another aspect of this invention, each processor circuit which serves as the first and second processor in the co-processor is itself novel. As such, the invention provides embodiments directed to a processor including an input interface for loading communications programs and communications data as well as a first unit including processor instruction logic circuits for executing first portions of the communications programs. The first unit generally corresponds to a set of instructions provided with the processor from the manufacturer of the processor.

The invention however extends this instruction set and provides, in the processor, a second unit including extension processor instruction logic circuits for executing second portions of the communications programs and for processing at least one portion of the communications data. The second unit corresponds to an extension arithmetic logic unit (XALU) created according to this invention. The second portions of the communication programs are the extension ALU instructions which can, according to this invention, operate on the data passing through the processor. The processor also includes an output interface for storing results of the processing. The extension instructions are provided in addition to an existing core instruction set in each processor within the co-processor.

According to other embodiments of this invention, the extension instructions provide various operations. More specifically, according to this invention, a zero stuffing instruction logic circuit includes an input logic device which accepts an input bit stream. A detecting logic device detects a predetermined sequence of bits. An insertion logic device inserts a modifier into the input bit stream thus creating a modified bit stream and an overflow bit stream. Finally, an output logic device stores the modified bit stream in a predefined location and stores the overflow bit stream in a second predefined location and maintains overflow state information. By providing this circuitry, the invention offers a zero stuffing instruction for a microprocessor, such as a RISC microprocessor.

According to another embodiment of the invention, a zero unstuffing instruction logic circuit is provided and includes an input logic device which accepts an input bit stream and a detecting logic device which detects a first predetermined sequence of bits. A removal logic device is included which removes a second predetermined sequence from the input bit stream creating a modified bit stream. An output logic device is included which stores the modified bit stream in a predefined location and maintains borrow state and error state information. By providing this circuitry, the invention provides a zero unstuffing operation in the form of a single microprocessor instruction.

In yet another embodiment of the invention, a partial subtraction and conditional move instruction logic circuit, for use in rightward trie traversal, is provided. The circuit including an input logic device which accepts a first input data, a second input data and a third input data. A comparing logic device is included which performs a comparison between the first input data and the third input data. If the comparison results in the first input data being equal to the third input data then a down traversal state is set, and if the comparison results in the first input data being greater than the third input data then the second input data is copied into a predefined location and no state is set. If the comparison results in the first input data being less than the third input data then an insertion state is set and the first input data is inserted into a trie data structure. An output logic device stores the third input state in a predefined location and stores the first input data into the trie data structure and maintains the down traversal state and the insertion state information.

In yet another embodiment of the invention, a partial compare and conditional move instruction logic circuit, for upward trie traversal, is provided. The circuit includes an input logic device which accepts a first input data and a second input data. Also included is a comparing logic device which performs a comparison between the first input data and the second input data. If the comparison results in the first input data being equal to the second data then a terminate traversal state is set. If the comparison results in the first input data being not equal to the second data then the first input data is copied to a predefined location and no state is set. An output logic device stores the first input state in a predefined location and maintains the terminate traversal state information.

In yet another embodiment of the invention, a multiple compare instruction logic circuit is provided including an input logic device which accepts a first input data, a second input data and a third input data. A comparing logic device performs a comparison between the first input data and a series of predefined characters in the third input data. If the comparison results in the first input data being equal to any character in the series of predefined characters then a character match state is set. A comparing logic device performs a comparison between the first input data and a predefined boundary. If the first input data is within the predefined boundary then a character boundary state is set. An output logic device maintains the character match state and the character boundary state information.

In yet another embodiment of the invention, a CRC instruction logic circuit is provided including an input logic device which accepts a first input data, a second input data and a third input data. A calculating logic device which computes a CRC value based upon the polynomial defined in the first input data, the current state of the CRC calculation stored in the second input data and a third input data containing a portion of a message upon which to calculate a CRC. An output logic device which stores the CRC value in a predefined location.

Having these operations available as instructions which may be called by programs that implement the various protocols is beneficial for many reasons. Since the actual operations of each instruction are not performed purely in software, but rather as circuitry which carries out the instruction when called, higher co-processor operation speeds result. Also, since the instruction circuitry is activated by calling the instruction, the program can control when the circuitry is used, thus avoiding unnecessary operation of the circuitry as in prior art hardware only implementations. That is, extension instructions offering the aforementioned functions only activate their associated circuitry when called. This allows the processors to concentrate on program execution and conserves processor cycles.

The present invention utilizes the extensible instruction set feature of a programmable processor to implement time consuming data communications techniques as the aforementioned instruction circuits in hardware. These instructions overcome the aforementioned prior art problems of software and hardware solutions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a representation of the Status Register.

FIG. 5 is a representation of the Zero Stuff Overflow Accumulation Register (ZSE).

FIG. 6 is a representation of the Zero Stuff Overflow Data Register (ZSread).

FIG. 7 is a representation of the Zero Stuff State Register (ZSS).

FIG. 8 is a representation of the PPP Character Control Register.

FIG. 9 is a representation of the CRC Polynomial Register.

DETAILED DESCRIPTION OF THE INVENTION

Figure 1:
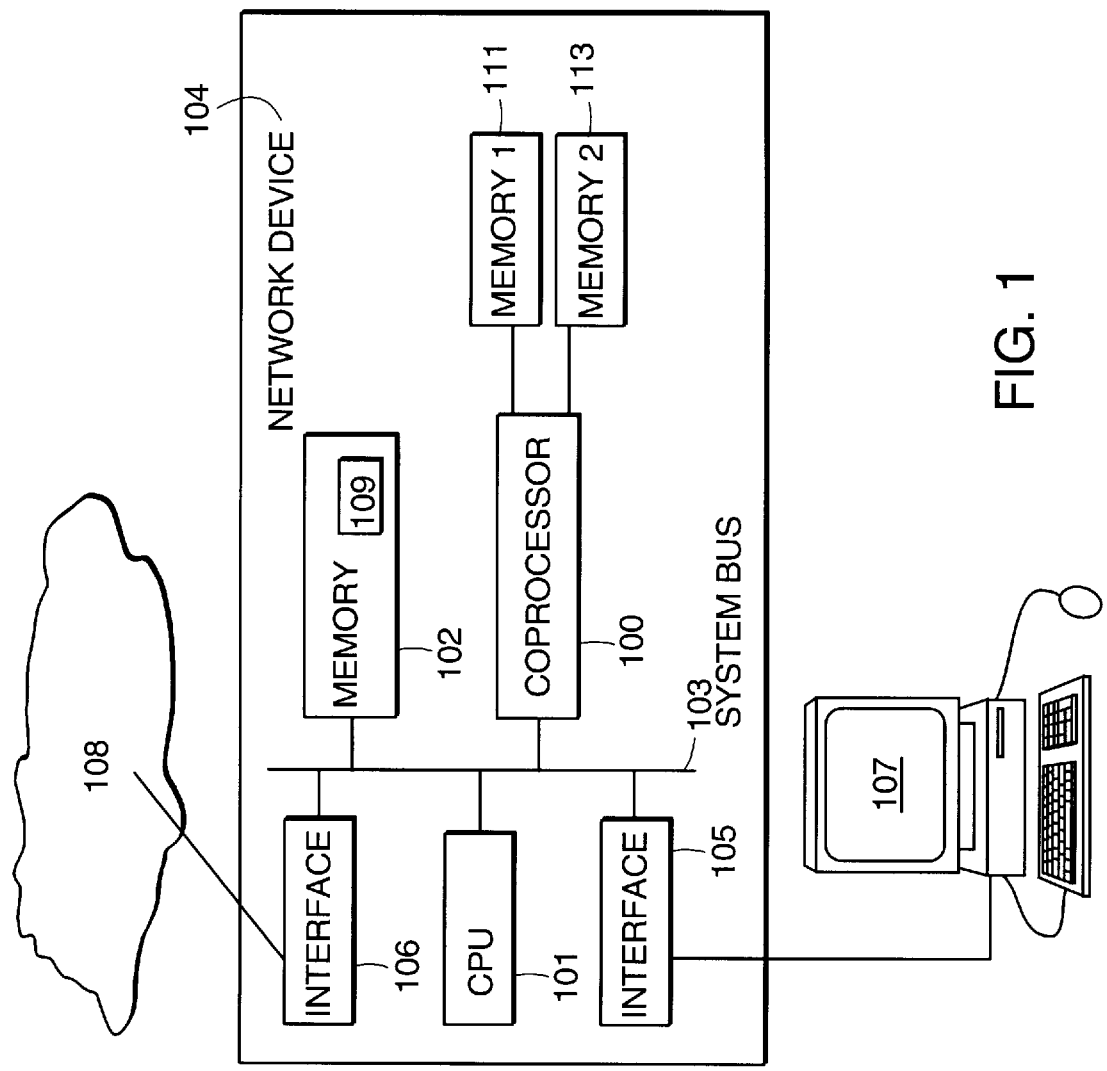
FIG. 1 is a block diagram illustrating a data communications device configured according to this invention.

FIG. 1 illustrates a network device 104 configured according to the present invention. Network device 104 includes a system bus 103 which intercouples interfaces 105 and 106, central processing unit (CPU) 101, memory system 102 and co-processor 100. Network device 104 may be, for example, a modem, gateway, proxy server, router, switch, hub, bridge or other network data communications device through which data may typically pass. Network device 104 provides the data communications capabilities needed to transmit data between host computer 107 and other hosts (not shown) on network 108. Network 108 may be, for example, a Wide Area Network (WAN) such as the Internet, or may be a Local Area Network (LAN) such as a corporate intranet. According to the invention, network device uses co-processor 100 to handle protocol operations on the data, instead of providing such operations in software on the CPU 101 or in hardware as individual separate processors, as in prior art systems.

As an example, CPU 101 in network device 104 operating on data according to this invention can configure interface 105 to accept data 109 from host computer 107 that is to be transmitted onto computer network 108. The data 109 is received and transferred into memory 102 over system bus 103. Before transmission of the data 109 to network 108, the CPU 101 instructs co-processor 100, to concurrently encrypt and compress and packetize the data 109. Once the data 109 is compressed and encrypted in packet format, co-processor 100 notifies CPU 101 of this event. The data 109 is then transmitted via interface 106 onto network 108 under the control of the CPU 101. In a similar manner, data 109 destined for host 107 is received at interface 106 from network 108 in packet form. The packets are buffered in memory 102. The data 109 is encrypted and compressed in packet form when it arrives at network device 104. CPU 101 instructs co-processor 100 to concurrently de-packetize, decompress and decrypt packets 109. When this process is complete, the CPU 101 is notified and transfers the data 109 to host 107 via interface 105.

Co-processor 100 concurrently performs protocols such as, for example, encryption and decryption, compression and decompression, and packet framing and de-framing protocols noted in the example above. Co-processor 100 can perform these protocols on multiple simultaneous streams of data. The co-processor 100 includes multiple programmable internal central processing unit circuits (internal programmable processors) as well as other circuitry. The preferred embodiment of co-processor 100 embodies these circuits as an Application Specific Integrated Circuit (ASIC) residing on a single chip. The co-processor 100 can implement protocols on data 109 in both the sending (i.e., host 107 to network 108) and receiving (network 108 to host 107) directions.

Generally speaking, the co-processor 100 is responsible for off-loading complicated data communication protocol processing and memory bandwidth intensive operations from the CPU 101. Co-processor 100 can be programmed to execute many different protocols concurrently and independently of each other, or in conjunction with each other.

The various protocols are performed by programming the co-processor 100 with operations to carry out the tasks associated with each specific protocol. Since the co-processor 100 is the only device on system bus 103 responsible for the operation of these protocols, less transactions with memory 102 are required. Prior art systems require the CPU 101 to process all protocols tasks in a slow manner via software, or provide separate processors for each protocol resulting in severe bandwidth limitations of system bus 103. Through the use of a single co-processor 100, the overall bandwidth and data throughput of network device 104 is increased by this invention. The complete operation of co-processor 100 will be discussed after an introduction to its architecture, which will be presented next.

Figure 2:
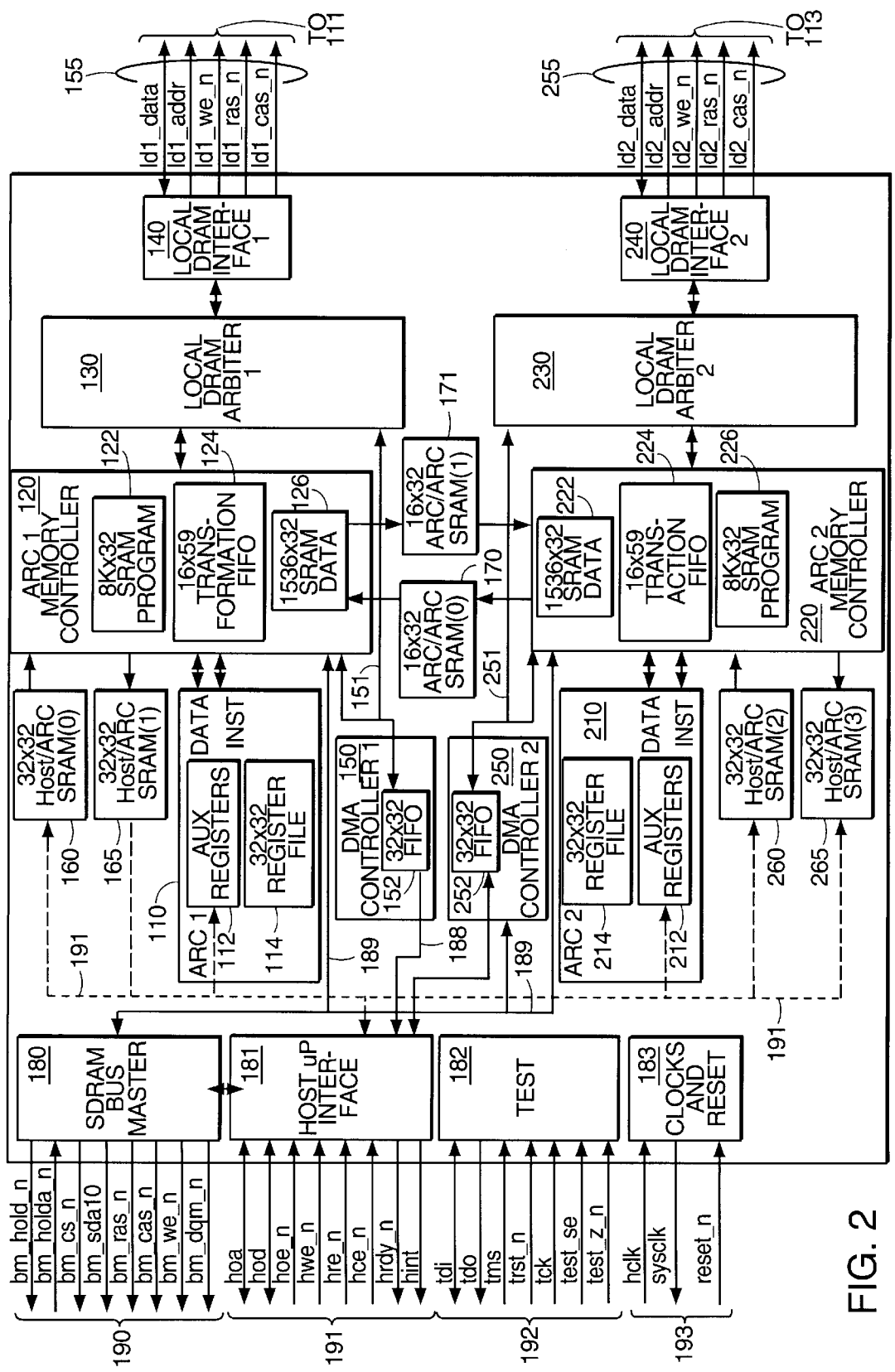
FIG. 2 is a block diagram illustrating the architecture of a co-processor device configured according to one embodiment of this invention.

FIG. 2 illustrates the architecture of co-processor 100 configured according to this invention. Co-processor 100 is symmetrical in nature. That is, many individual components of the co-processor 100 have equivalent counterparts which can operate independently of each other or in conjunction with each other. In FIG. 2, the symmetrical nature of co-processor 100 is illustrated by similarly configured upper and lower halves. Generally, the preferred embodiment of co-processor 100 has two symmetrical systems; a dual processing system, and a dual memory system, as well as one shared interface system. As such, co-processor 100 comprises two entirely functional processing engines having distinct programmable processors, memories, and bus systems which can function separately or in conjunction with each other. Furthermore, adding an additional number of processing engines (processor, memory and bus system) is contemplated to enhance overall processing speed provided symmetry is maintained.

In the present embodiment, the dual processing system includes first and second extended internal programmable processors 110 and 210. Processors 110 and 210 are preferably similar in configuration to one another, but the invention is not meant to be limited as such. In the preferred embodiment, each internal programmable processor 110, 210 is an extended Argonaut 32-bit RISC (ARC) processor having a 4-stage pipeline.

ARC processors 110 and 210 in this embodiment are produced by and may be purchased from Argonaut Technologies Ltd., United Kingdom. ARC Processors 110 and 210 each incorporate a full 32-bit core instruction set, as well as 32-bit data and addressing modes and operate at 100 MHZ. Since a core instruction set is provided, programs may be written which implement the various aforementioned protocols. However, according to one aspect of this invention, to allow these protocols to execute faster, ARC processors 110, 210 are extended with additional instructions, as will be explained in detail later. Depending upon the purpose of network device 104, the appropriate programs providing the required algorithms are downloaded (i.e. programmed) into program memory 122 (discussed shortly) before data processing begins.

Each processor 110 and 210 may be programmed independently of the other. For example, processor 110 can be configured to perform a distinct function such as data encryption, while processor 210 can be programmed to perform data compression. These protocols may be performed on different data, or on the same data. The protocols may be executed in parallel, with each processor 110, 210 concurrently performing its respective task, or the protocols may be executed in series, with one processor (i.e. 110) processing data after the other (i.e. 210) has completed its processing on that same data.

An important aspect of this invention is included within processors 110 and 210. According to this aspect, each processor 110 and 210 is extended with additional instructions which help optimize the execution of the various protocols programmed into processors 110 and 210. To extend each processor 110 and 210, VHDL code representing the core circuitry and instruction set of each ARC processors is modified with additional extension instructions. That is, interfaces in the VHDL logic code which describe the actual processor circuits 110 and 210 are used to create extension instructions that provide enhanced processor features according to embodiments of this invention. These extension instructions are provided in addition to a set of core instructions already provided in the VHDL code representation of processors 110 and 210.

The various extension instructions of this invention perform protocol tasks such as bit-stuffing, CRC computations, multiple compares, and trie traversals on specified portions of data. By implementing these operations as actual instructions in processors 110 and 210, co-processor 100 can process data according to the requirements of various data communications protocols at very high speeds. The extension instructions alleviate the need for a programmer to develop an algorithm to implement the processing provided by the instructions. This saves program development time and avoids algorithm coding errors. Moreover, the extension instructions are implemented as underlying circuitry and therefore perform the desired operation faster than a pure software solution to the same operation. The extension instructions are also more efficient than a pure hardware solution to the operation being performed, since the instructions are called only when needed. Prior art hardware-only solutions continuously perform a specific operation and then additional software is used to retrieve the ever-present result from a standardized location. Since the extension instructions of this invention may be called only when needed, processor cycles are conserved.

Another aspect of the invention is the dual memory systems of co-processor 100. The dual memory systems allow data to be quickly accessible to co-processor 100, without having to rely on memory 102 of network device 104. Each memory system comprises memory controllers 120, 220, local DRAM arbiters 130, 230, local DRAM interfaces 140, 240, memory interfaces 155, 255, external co-processor memories 111, 113 (FIG. 1), and Direct Memory Access (DMA) controllers 150, 250, respectively.

Co-processor memories 111 and 113 are high speed random access memories which can support 50 nanosecond random access times in a 32 bit address mode, and 20 nanosecond access times in a 32 bit bursting access page mode. In this particular embodiment, co-processor memories 111 and 113 are not part of the co-processor ASIC. Rather, local DRAM interfaces 140, 240 couple to respective memory interfaces 155, 255 to provide access to co-processor memories 111 and 113. Co-processor memories 111 and 113 are used during protocol processing for such tasks as storing data to be compressed/decompressed or encrypted/decrypted. Co-processor memories 111 and 113 can also store dictionaries used for compression algorithms such as V.42bis.

Two DMA controllers 150, 250 are provided in co-processor 100, one for each processor 110, 210. Each DMA controller 150, 250 interfaces to a respective memory controllers 120, 220, local DRAM arbiters 130, 230, SDRAM bus master 180 and Host Interface 181. Memory busses 151, 251 provide the interfaces between these components. Each DMA controller 150, 250 can be configured by a respective processor 110, 210 to move blocks of data to and from external memory 102 to a respective co-processor memory 111, 113. Each processor 110, 210 provides to a respective DMA controller 150, 250 a source address, a destination address, and word count to transfer data to and from the available memory spaces on co-processor 100. Embedded in each DMA controller are two 32 by 32 bit FIFO buffers 152, 252 which are used to buffer data being exchanged.

Two shared memories 170 and 171 within co-processor 100 allow each internal programmable processor 110, 210 to exchange messaging and/or data. Communications between processors 110 and 210 may be needed in a case where both processors 110 and 120 are programmed to perform protocols such as compression and then encryption in conjunction with each other.

Other components in each memory system include synchronous SRAM's 160, 165 and 260, 265. These SRAM's provide one-way memory paths between the CPU 101 and the respective processor 110, 210, and vice versa. The purpose and use of the SRAM's 160, 165 and 260, 265 is under software control on a per protocol basis. SRAM memories 160 and 260 may be written to by the CPU 101 of network device 104 and may be read by internal processors 110 and 210, respectively. SRAM memories 165 and 265 may be written to respectively by internal processors 110 and 210 and may be read by the CPU 101 of the network device 104.

The third system in co-processor 100 is the interface system. The interface system includes signal lines 190 through 193 which interconnect co-processor 100 to the system bus 103 (FIG. 1) of network device 104. The signal lines 190 through 193 allow the co-processor 100 to be programmed and controlled by CPU 101. Signal lines 190 couple to an SDRAM bus master 180 which is used to take control of the system bus 103 to move data between memory 102, DMA controllers 150, 250 and each memory controller 120, 220. The SDRAM bus master 180 transfers the data on memory bus 189.

Signal lines 191 couple to host processor interface 181 which is a 32-bit wide synchronous, ready-controlled bus interface. Host processor interface 181 is used to program each internal programmable processor 110, 120 under the direction of CPU 101. The programming takes place over programming bus 191. The host processor interface 181 also handles the generation of interrupts to the CPU 101 during operation of co-processor 100.

Signal lines 192 are used for testing co-processor 100 and interface to test circuit 182. Signal lines 193 interface system bus 103 to clock and reset circuitry 183. Clock and reset circuitry 183 provides clock and reset signals to the various components of co-processor 100. Reset is used to reset and program the co-processor 100 via signaling from CPU 101.

Figure 16:
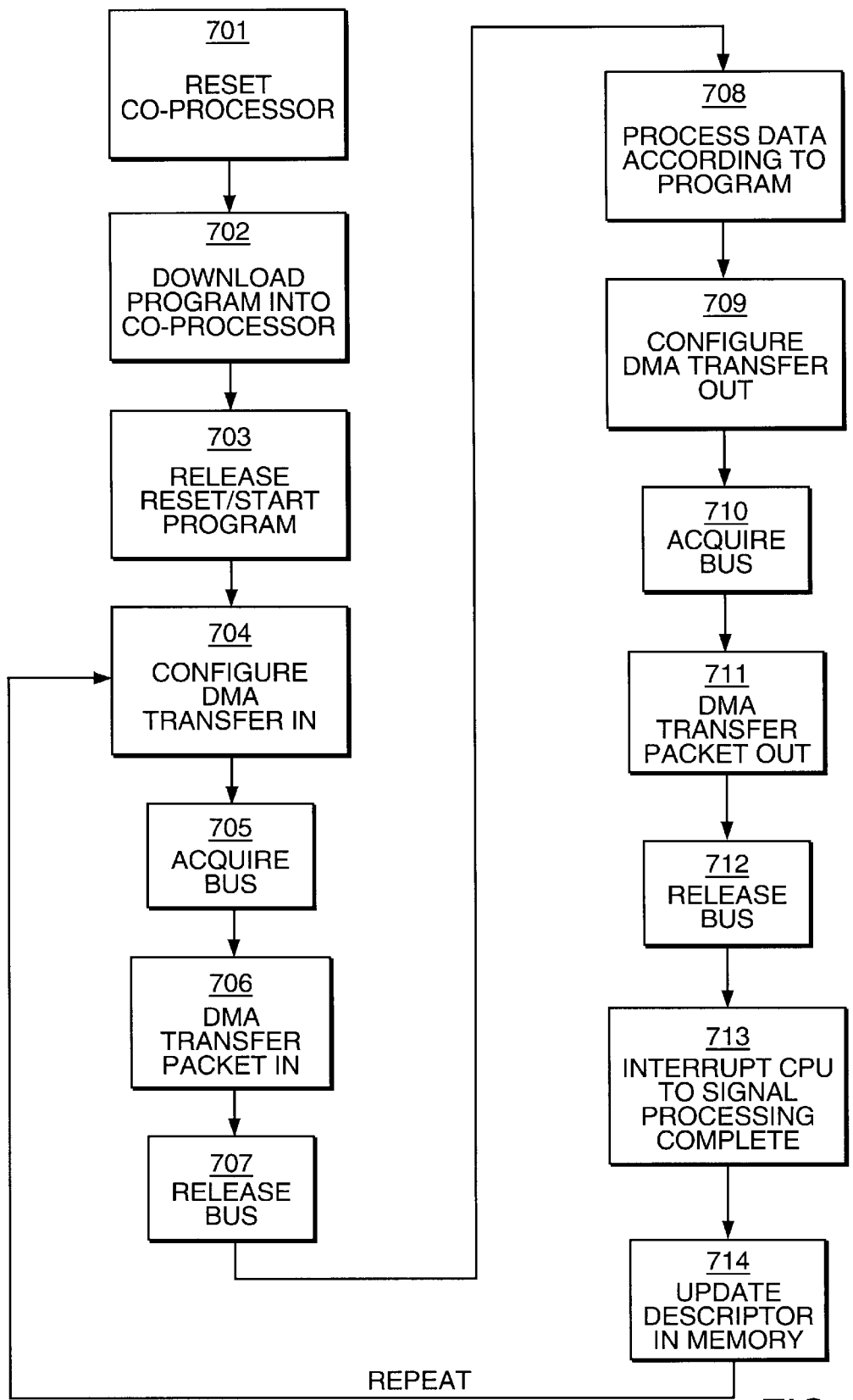
FIG. 16 illustrates a flow chart of the processing performed by a processor in the co-processor configured according to this invention.

The operation of network device 104 configured with co-processor 100 will now be given in conjunction with the processing steps given in FIG. 16. Processing steps 701 through 711 illustrate processing of data on a packet by packet basis as performed by co-processor 100 according to this invention. Upon power-up of network device 104 co-processor 100 is in a reset state which may be removed by application of a reset signal via signal lines 193 (Step 701) from CPU 101. Once reset is applied, processors 110 and 210 in co-processor 100 remain in a reset (e.g. idle) state until activated by CPU 101.

Before network device 104 begins to accept and process network data 109, each processor 110, 210 in co-processor 100 must be programmed for operation (Step 702). Programs for each processor 110, 210 are downloaded into SRAM program memory 122 via the host processor interface 181 prior to the release of the reset state. Host processor interface 181 is a slave-only interface which present a memory map to CPU 101 which determines where each program is loaded.

Each processor 110 and 210 may be programmed with identical or differing programs. Typically, in operation, one processor (e.g. 110) will process transmit data and the other processor will process receive data. Programs tailored to each specific task will be loaded into respective processor program spaces 122, 222. Once each processor 110, 210 has an associated protocol program loaded into its respective program memory space 122, 222, the reset state can be removed by CPU 101 (Step 703) thus starting execution of each program. The remaining description of processing is given with respect to processor 110 and its associated co-processor components (i.e., the upper half of FIG. 2). However, since co-processor 100 is symmetrical in nature, it should be understood that the same description of operation applies to processor 210 and its associated components.

As network device 104 begins to process data (e.g., packets) 109 between network 108 and host computer 107, memory 102 buffers each data packet 109. A descriptor table (not shown) lists each of the data packets 109 stored in memory 102. The descriptor table indicates which packets need to be processed, and which have already been processed by the protocols in co-processor 100. The CPU 101 maintains the list of packets in the descriptor table which have yet to be processed, and co-processor 100 maintains the list of packets which have been processed by the protocol programs.

To process a packet, one of the processors (assume processor 110 for this example) reads the descriptor table in memory 102 and obtains packet information (i.e., how many packets available, packet size, location address, etc.) needed to configure a DMA transfer (Step 704) to copy one or more data packets 109 into data SRAM 126.

The DMA controller 152 associated with processor 110 interfaces to the SDRAM bus master 180 and to the memory controller 120. The DMA controller 152 can transfer data to or from memories 122, 124, 126, co-processor memory 111 and network device memory 102. Once configured (Step 704), processor 110 acquires the system bus 103 of network device 104 (Step 705) by making a bus request. In this description, the system bus may be a memory bus of network device 104. Assume for this example that processor 110 requests system bus 103.

Next, DMA controller 152 requests access to memory 102 and transfers (Step 706) the requested data packets 109 to the internal data SRAM 126, or to co-processor memory 111, depending upon the type of transfer requested, and how much data is being transferred. These parameters are dependent on the particular protocol program being executed. Typically, data packets 109 will be transferred to the data SRAM 126.

DMA transfers operate without intervention on the part of processor 110. This allows simultaneous transfer and processing of separate data packets 109. In a preferred embodiment, the data SRAM 126 in memory controller 120 (and 220) is partitioned into three sections; one section contains one packet of data which has been processed and is being transferred from co-processor 100, one section contains one packet currently being processed by the programmed processor 110, and one section contains one packet currently being transferred into co-processor 100 to be processed next. Each section of SRAM 126 may be accessed concurrently by the DMA controller 152 and/or processor 110. This avoids access collisions from the processor 110 and the DMA controller 152. Accordingly, step 706 indicates that as a DMA transfer is transferring a packet into data SRAM 126, another concurrent DMA transfer is transferring a formerly processed packet out of co-processor 100 to memory 102.

Once the DMA transfer (Step 706) is complete, the system bus 103 is released in step 707.

The processor 110 processes the data packet (Step 708) stored in the appropriate section of data SRAM 126 according to the program which is executing. To process a packet, the processor 110 applies one or more protocols or algorithms to the packet, for which that processor is programmed. For example, if processor 110 is programmed for V.42bis compression, the data packet is compressed accordingly. V.42bis compression requires construction of a dictionary to perform the compression and decompression. This dictionary is stored in co-processor memory 111. Since co-processor 100 may operate on many streams of data packets 109 concurrently, co-processor memory 111 may store separate dictionaries for each data stream simultaneously.

Access to co-processor memory 111 by processor 110 is handled by the local DRAM arbiter 130. DRAM Arbiter 130 manages requests for transfers to and from co-processor memory 111 such that the aggregate bandwidth of data transfers is maximized. Memory bandwidth optimization is discussed in detail in the Local DRAM arbiter description section of the provisional patent application previously incorporated by reference.

Once a data packet 109 has been processed by the protocol program, processor 110 configures a new DMA transfer (Step 709) and again acquires the bus (Step 710). The data is transferred out to (Step 711) as a processed data packet 109 back to memory 102 for further processing by CPU 101. At the completion of the DMA transfer (Step 711), the bus is released (Step 712) and the DMA controller 152 will interrupt the processor 110 (Step 713) via host processor interface 181 to signal the completed transfer and processing of the data packet 109. The processor 110 then updates the descriptor table (Step 714) in memory 102 to indicate that particular data packet 109 has been processed.

The procedure described above of transferring data into co-processor 100, processing the data, and transferring the data out of co-processor 100 (i.e. Steps 704 through 714 in FIG. 16) is repeated for all data packets passing through network device 104, under the direction of CPU 101. It is to be understood that while the procedure above was explained in relation to processor 110, processor 210 and its associated components perform the same or a similar procedure on data.

Though preferred embodiments of the invention provide the ability to program co-processor 100 to perform encryption/decryption and compression/decompression of data, the co-processor of the present invention is not limited to these protocols alone. Rather, protocols such as HDLC packet framing, bit-stuffing, CRC computations, the Serial Line Interface Protocol (SLIP), the Point-to-Point protocol, V.42bis, LZS-Lempel Ziv compression and other protocol operations may be performed by a network device 104 equipped with the co-processor 100.

Preferred embodiments of the invention include the co-processor 100 programmed for data communications related protocols, but the invention is not limited as such. That is, other protocols, such as image or signal processing protocols may be programmed into co-processor 100, with the result being that the co-processor 100 can execute these protocols simultaneously on processors 110, 210 either in conjunction with each other, or independent of each other. In these alternative embodiments, the co-processor is used in a device other than a network device. A device such as a signal processing device can be equipped with a co-processor according to this invention. Overall execution speed in a device using co-processor 100 is increased because the data need not be processed by the host computer's CPU. Furthermore, speed increases are realized because data to be processed remains within co-processor 100 for multiple protocol operations, without being passed from dedicated processor to dedicated processor for each protocol operation, as in prior art systems.

The dual processing nature of co-processor 100 is an important aspect of the invention. That is, each processor 110, 210 can be programmed according to the steps in FIG. 17. Since each processor 110, 210 is provided with shared memory allowing communications to take place between one another, if the programs of each processor 110, 210 provide for the appropriate cooperation with each other, they can share data. This allows protocols on one processor to complete and pass data to protocols on the other processor for further processing.

As an example, if processor 110 is programmed for encryption, when it has finished completing its encryption process (i.e., Step 707), processor 110 places the data in shared memory 171 (FIG. 2) instead of configuring and performing a DMA transfer (Steps 708, 709). Processor 110 then sends an indication to processor 210 that it has completed its encryption process on the data. If a compression program is executing on processor 210, it reads the data in memory 171 and performs its compression process. The foregoing is an example of multiple protocols operating in conjunction with each other on co-processor 100.

Those skilled in the art will now readily understand that many variations on the former example are possible. For instance, processor 110 may perform decompression on a stream of data, after which processor 210 performs decryption on the decompressed stream of data. By allowing multiple processors to operate in conjunction with each other on the same data, the co-processor alleviates bandwidth limitations of the system bus 103 in network device 104. This is because the data does not have to return from the co-processor 100 to the CPU 101 after each protocol operation. This also reduces the number of reads and writes required to memory 102. Fewer memory fetches allows network device to operate at faster data rates.

While the aforementioned examples are provided with respect to two processors 110, 210, the invention contemplates embodiments having more than two processors within co-processor 100. For example, a co-processor according to this invention can have four processors along with associated memory and interface systems. The principles and concepts of the invention are applicable to these embodiments as well.

For details of specific signaling, electrical and operational characteristics of the memory, processing, bus and interface systems of co-processor 100, the reader is referred to the appropriate respective portions of the provisional application formerly incorporated by reference. That provisional patent application describes in detail a preferred embodiment of the co-processor 100 called "Chromite".

Figure 3:
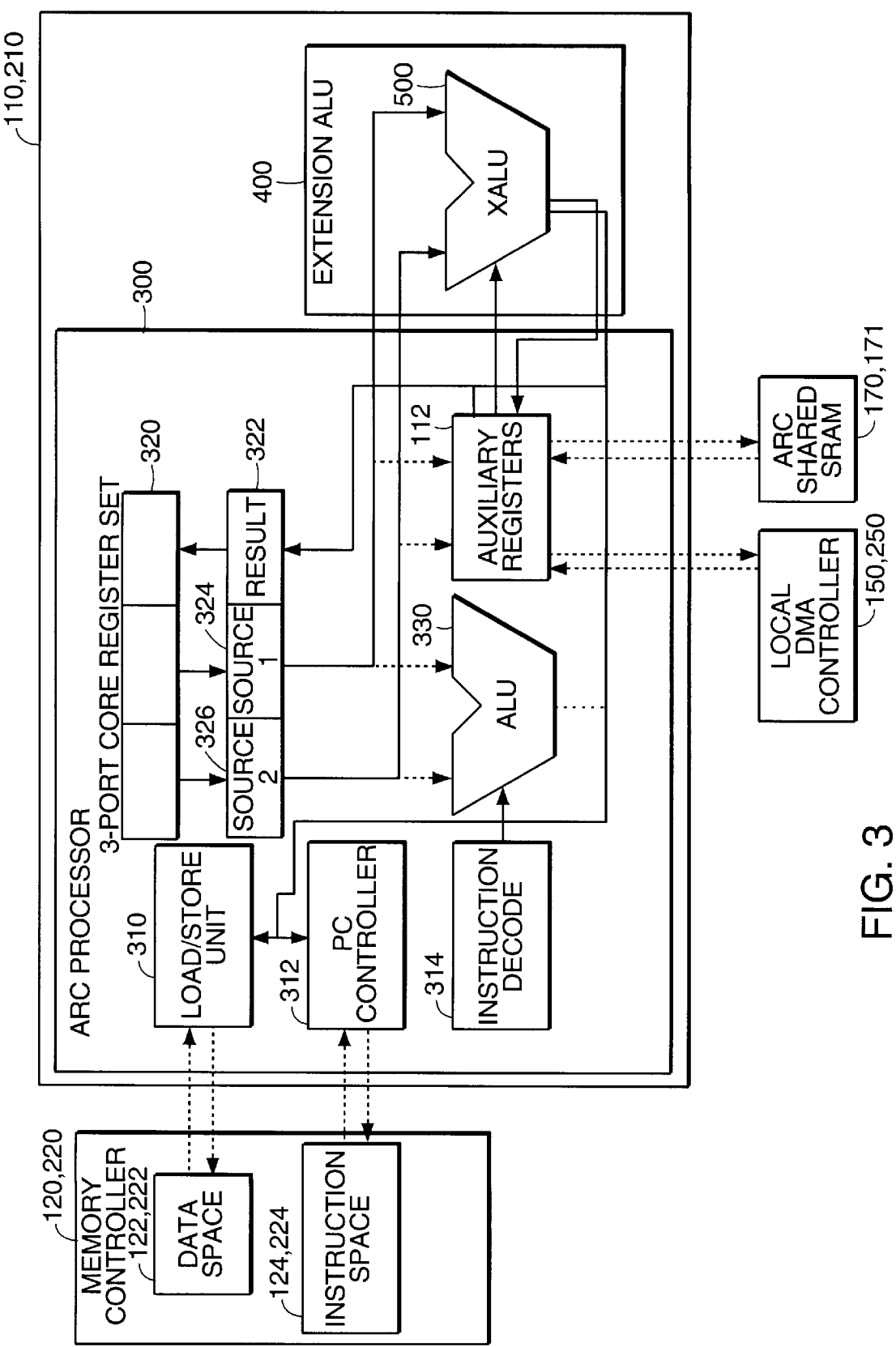
FIG. 3 is a block diagram illustrating the architecture of a programmable instruction set processor as used within the co-processor according to this invention.

As mentioned previously the ARC processor 300 is extended with instructions according to this invention to provide support for data communications programs (i.e., protocols). FIG. 3 illustrates the configuration of processors 110, 210 according to this invention. The architecture in FIG. 3 illustrates only one processor (i.e., either 110 or 210) since both are generally configured the same according to embodiments of this invention. A standard ARC processor 300 is supplied by and may be purchased from Argonaut Technologies, Ltd. and contains a load/store unit 310, a PC controller 312, an Arithmetic Login Unit ("ALU") 330, an extension Arithmetic Logic Unit ("XALU") 500, an instruction decoder 314, 3-port core register sets 320 to 322. Auxiliary registers 112 are illustrated within ARC processor 300, but are provided as part of this invention.

The standard off-the-shelf ARC processor 300 provides a core set of instructions in ALU 330, used for executing programs. The invention extends this core instruction set with extension instructions in XALU 500. These extended instructions assist in execution of data communication programs. According to this invention the additional instructions provided in XALU 500 include "zero stuffing", "zero unstuffing", "partial subtraction and conditional move", "partial compare and conditional move", "multiple compare" and "CRC". While FIG. 3 illustrates the XALU 500 as a separate circuit for clarity and ease of description of this invention, the invention is not meant to be limited as such. The XALU 500 in an actual implementation may share certain circuit elements and components with other parts of ARC processor 300, such as the ALU 330.

The ARC processor 110, 210 operates by loading communications program instructions and communications data from the instruction space 124, 224 and data space 122, 222 in the memory controller 120, 220, respectfully, under control of the load/store unit 310. Each instruction of a program includes an op-code which identifies the instruction along with one or more operands which contain communications data to be operated on by the instruction. For example, an instruction to move data may appear in program code as "MOV A,B", where "MOV" is an instruction to move some data into a memory location, and "A" is a register containing the data to be moved, and "B" is a register containing an address in memory where the data is to be stored. Each program instruction is decoded by the instruction decode unit 314 which determines whether the instruction is a core instruction provided by a standard off-the-shelf ARC processor (to be executed by the ALU 330) or an extended instruction (to be executed by the XALU 500) as provided by the invention. The operands (i.e., the data) for both core and extended instructions are placed into "source 1" 326 and "source 2" 324, which represent registers of various types. Execution of certain instructions produces a result. After these types of instructions are decoded and their operation is performed on the operand data, the resulting data is stored in result 322.

Auxiliary registers 112 are provided by this invention to aid in the execution of extended instructions in XALU 500. According to this embodiment, auxiliary registers 112 include a zero stuff overflow accumulation ZSE register 510 (see FIG. 5), a zero stuff overflow data ZSread register 514 (see FIG. 6) and a zero stuff state ZSS register 512 (see FIG. 7). These extra registers 510, 512 and 514 support zero stuffing and zero unstuffing extension instructions, as well as other instructions. Other registers are provided as well. A PPP control character register 516 (see FIG. 8) supports the multiple compare extension instruction and a CRC polynomial register 518 (see FIG. 9) supports the CRC extension instruction. The details of execution of each extension instruction, including their interaction with the auxiliary registers is discussed below. Additional details of each extension instruction's operation may be found in respective sections of the provisional patent application formerly incorporated by reference.

In addition to auxiliary registers 112, ARC processors 110, 210 provide core registers 320, 322 which are used by instructions (both core and extension) during execution of program instructions. FIG. 4 shows a representation of the Status Register 508. This register is used to communicate processor condition codes and interrupts to a host CPU (i.e., CPU 101 in FIG. 1), and maintains a program counter for an executing program.

Figure 10:
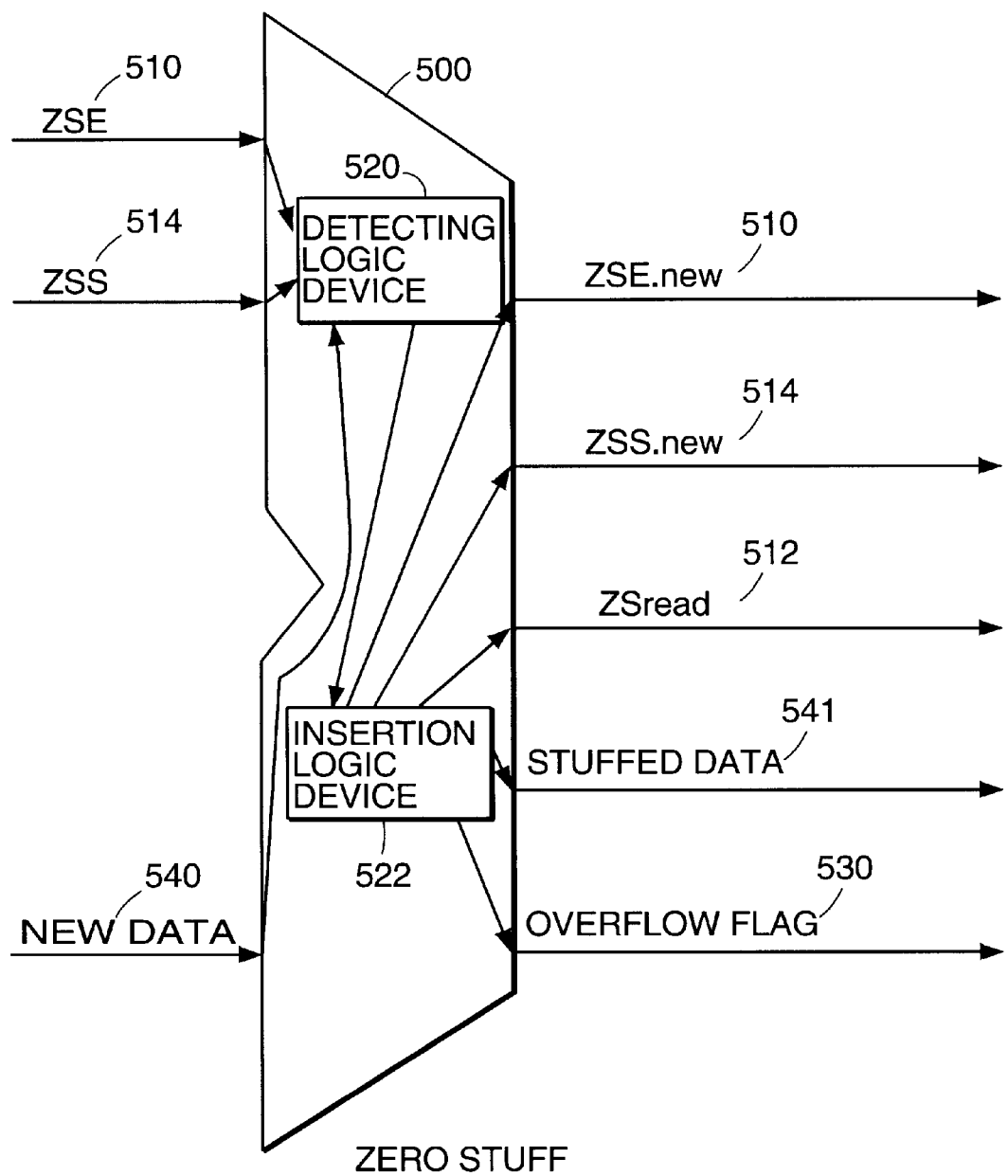
FIG. 10 is a diagram illustrating the inputs, outputs and processing of the zero stuff instruction.

FIG. 10 shows a representation of the circuitry for the zero stuff instruction as provided by this invention. Zero stuffing or the zero stuff instruction implements in one single instruction the data communications algorithm commonly known as "bit stuffing". The zero stuff extension instruction works in conjunction with extension registers ZSE 510, ZSS 514, and ZSread 512. In operation, a detecting logic device 520 accepts a bit stream of new data 540 along with zero stuffing state information in ZSS 514 and an accumulated overflow in ZSE 510 (i.e., overflow may occur from a previously executed zero stuff instruction). When a first predetermined sequence of bits (i.e., "11111") is detected in new data 540, the detecting logic device 520 communicates with the insertion logic device 522 to insert a second predetermined sequence (i.e., insert a "0" bit) into the new data 540 bit stream, after the first predetermined sequence of bits. The resulting bit stream (i.e., "111110") is stuffed data 541. Assuming the first predetermined sequence of bits occurs in new data 540, stuffed data 541 will be longer in length (number of bits) then new data 540, due to the insertion of the second predetermined sequence. This causes overflow. Any overflow created by the insertion logic device 522 is stored in the accumulated overflow register ZSE.new 510.

Multiple occurrences of the zero stuff operation may occur one after another. In this instance, data to be stuffed is "stuffed" in portions, with each stuffing instruction picking up where the previous zero stuffing instruction left off in the new data 540. As such, updated zero stuffing state information indicating where a next bit stuffing instruction should begin is stored in ZSS.new 514. If the accumulated overflow register ZSE.new 510 itself overflows an overflow flag 530 is set and the overflow is stored in ZSread 512. For more details on zero stuffing see Section 4.9.2 in the provisional application formerly incorporated by reference.

Figure 11:
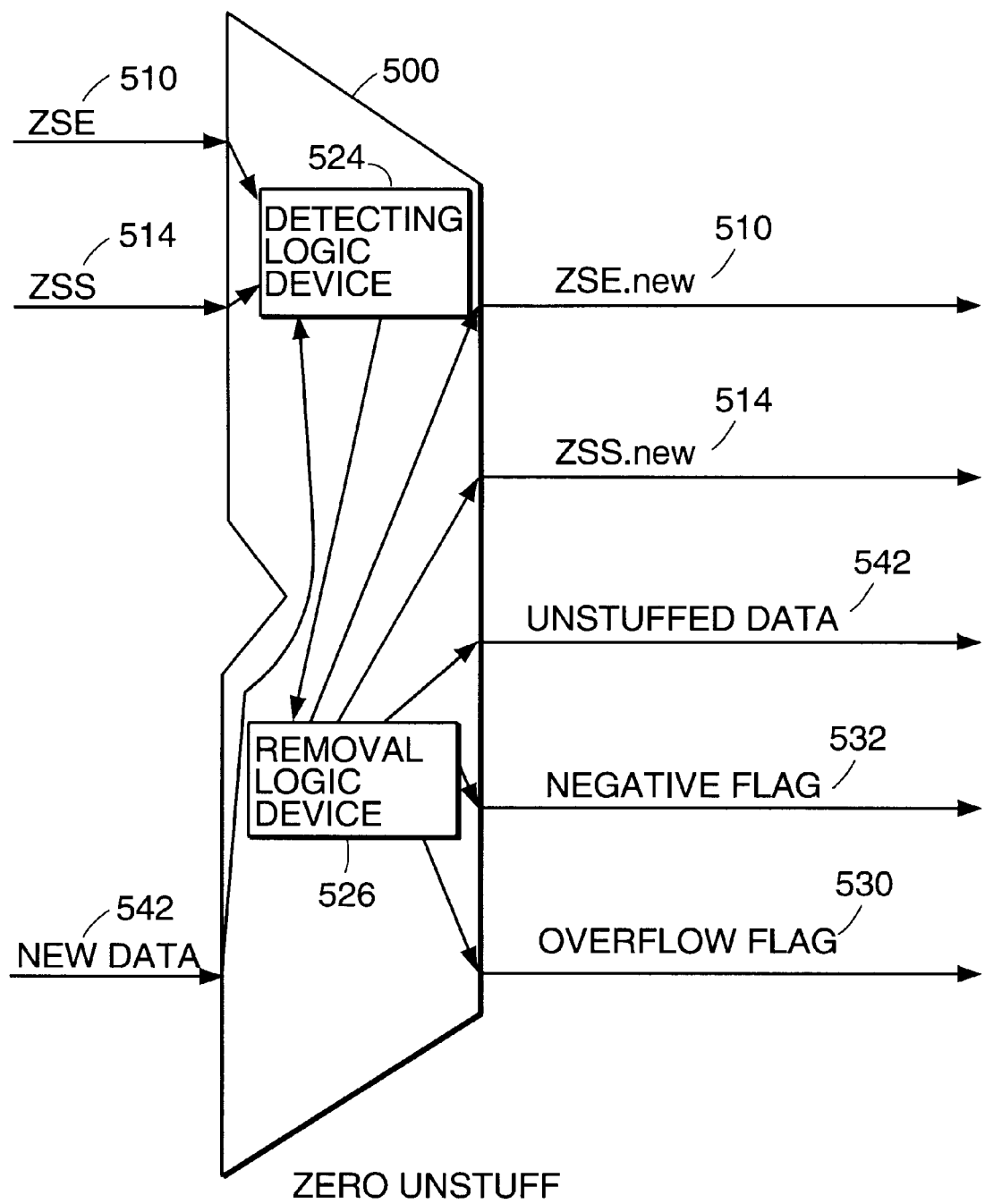
FIG. 11 is a diagram illustrating the inputs, outputs and processing of the zero unstuff instruction Diagram.

FIG. 11 illustrates a representation of the zero unstuff instruction circuit as provided by this invention. Zero unstuff is the converse instruction of zero stuff. That is, at a sending network device, zero stuff looks at a portion of data such as a data stream or a packet and inserts a "0" bit after any sequence of five "1" bits in this data. Then, at the receiving network device, zero unstuff removes the "stuffed" "0" bits that were inserted by the zero stuff instruction.

The zero unstuff extension instruction works in conjunction with extension registers ZSE 510 and ZSS 514. As noted above, operation of zero unstuff proceeds similarly to the zero stuff instruction, except that bits are removed from new data 542, instead of being added. In operation, a detecting logic device 524 accepts a bit stream of new data 542. Detecting logic device 524 detects a first predetermined sequence of bits (i.e. 111110). The predetermined sequence is five one bits followed by a zero bit. If the first predetermined sequence of bits is detected, the detecting logic device 524 communicates with the removal logic device 526 to remove a second predetermined sequence (i.e., the trailing "0") thus producing unstuffed data 543 (i.e., 11111). After each execution of the zero stuff instruction, information regarding where that instruction left off in the data (i.e., the current zero stuffing state information) is stored in ZSS 514 and ZSE 510. This information may be used upon execution of the next zero unstuff instruction. If the zero unstuff instruction is started with an underflow condition (i.e., too few bits to perform the unstuffing operation properly) in ZSE 510 then a negative flag is set and the instruction does not unstuff any new data 542. For more details on the zero unstuff instruction see Section 4.9.3 in the provisional application formerly incorporated by reference.

Various registers are used to support zero stuffing and unstuffing instruction operations. FIG. 5 shows a representation of the Zero Stuff Overflow Accumulation Register (ZSE) 510. ZSE 510 is used to store the new data 540 bit stream as it expands because of overflow during zero stuffing operations. ZSE 510 also stores bits to be used for "borrowing" in unstuffing operations. FIG. 6 shows a representation of the Zero Stuff Overflow Data Register (ZSread) 512. ZSread 512 is used to store the data that overflows the ZSE 510 register during zero stuffing operations. FIG. 7 shows a representation of the Zero Stuff State Register (ZSS) 514. ZSS 514 is used to store state and overflow status information. For more details on these registers see Section 4.3.13 through 4.3.15 of the provisional application formerly referenced.

Certain data communications protocols for compression and decompression (e.g., V.42bis) store information in trie data structures. These trie structures, which are similar in nature to multi-way search trees such as binary trees, must be traversed in an efficient fashion to obtain the requested data to provide acceptable data communications performance. The present invention provides two instructions to aid in trie traversal; the "partial subtraction and conditional move" extension instruction for speeding up trie-right traversals, and the "partial compare and conditional move" extension instruction for speeding up trie-up traversals.

Figure 12:
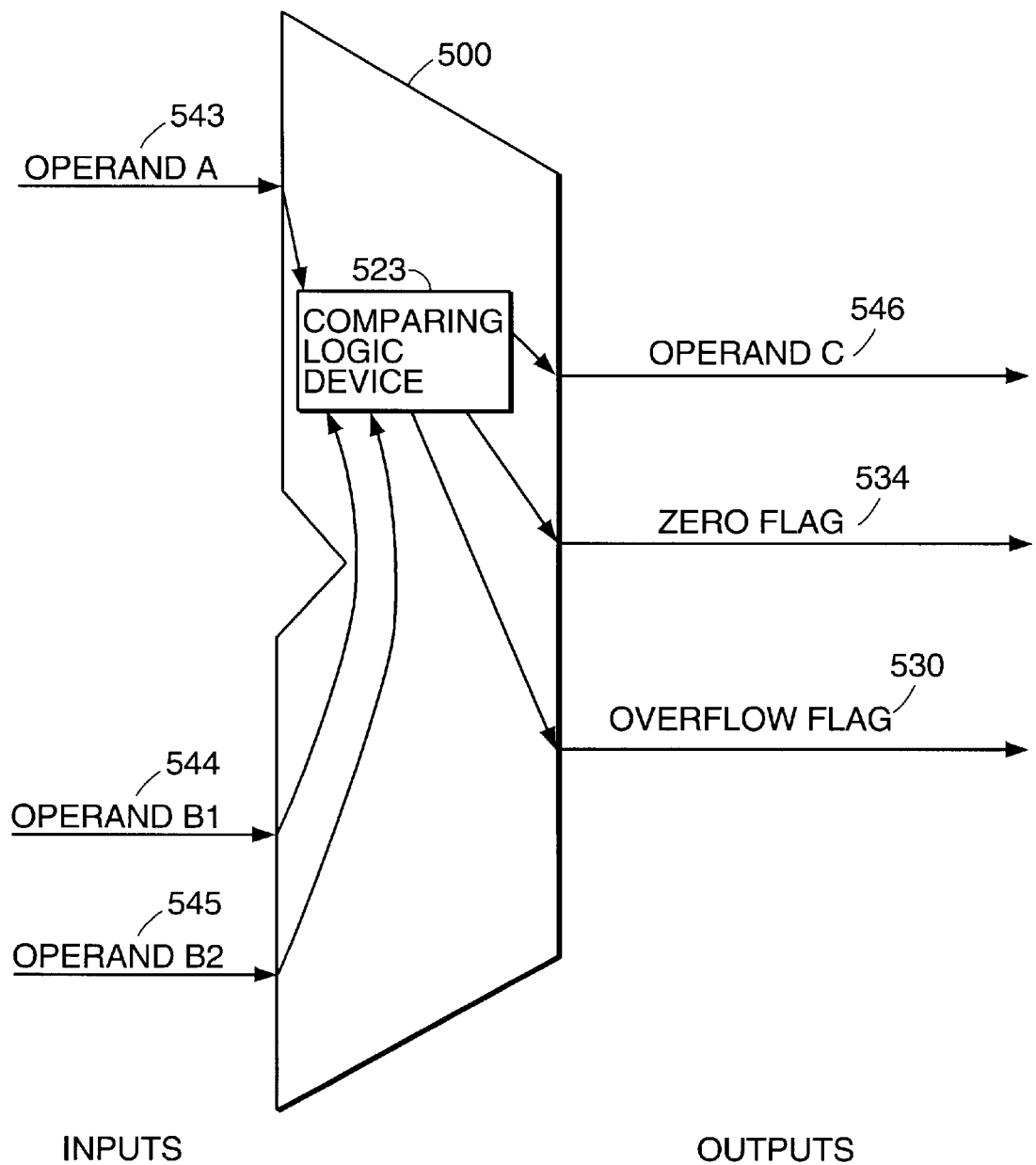
FIG. 12 is a diagram illustrating the inputs, outputs and processing of the partial subtraction and conditional move instruction Diagram.

FIG. 12 illustrates a representation of the partial subtraction and conditional move instruction circuit in XALU 500 as provided by this invention. This instruction accepts three inputs; (i) a character which is to be searched for in the trie as Operand A 543, (ii) a pointer to the next right node in the trie as Operand B1 544, and (iii) the character stored at the next right node in the trie as Operand B2 545. The comparing logic device 523 compares the input character in Operand A 543 with the character stored at the next right node in the trie (Operand B2 545). There are three possible results to this comparison. First, if the input character in Operand A 543 is greater than the character stored at the next right node in the trie (Operand B2 545) then a match has not been found. Accordingly, there are more nodes in the trie to be compared, and so the pointer to next right node in the trie (Operand B1 544) is copied to Operand C and no flags are set. Second, if the input character in Operand A 543 is equal to the character stored at the next right node in the trie (Operand B2 545) then a match has been found in the trie and the zero flag 534 is set to indicate that the next traversal should be to the next node down in the trie. And third, if the input character in Operand A 543 is less than the character stored at the next right node in the trie (Operand B2 545) then a match has not been found and the character in Operand A 543 is added as a new node in the trie. In the later case, the overflow flag 530 is set indicating the input character in Operand A 543 was inserted in the trie.

By offering a single instruction that implements a "partial subtraction and conditional move" operation, the invention eliminates the need for a software protocol developer to develop code for this operation, thus saving time. Also, since the instruction is implemented as circuitry in XALU 500, execution of the operation is very fast, yet at the same time, is only performed when needed. For more details on partial subtraction and conditional move see Section 4.9.4 in the provisional application formerly referenced.

Figure 13:
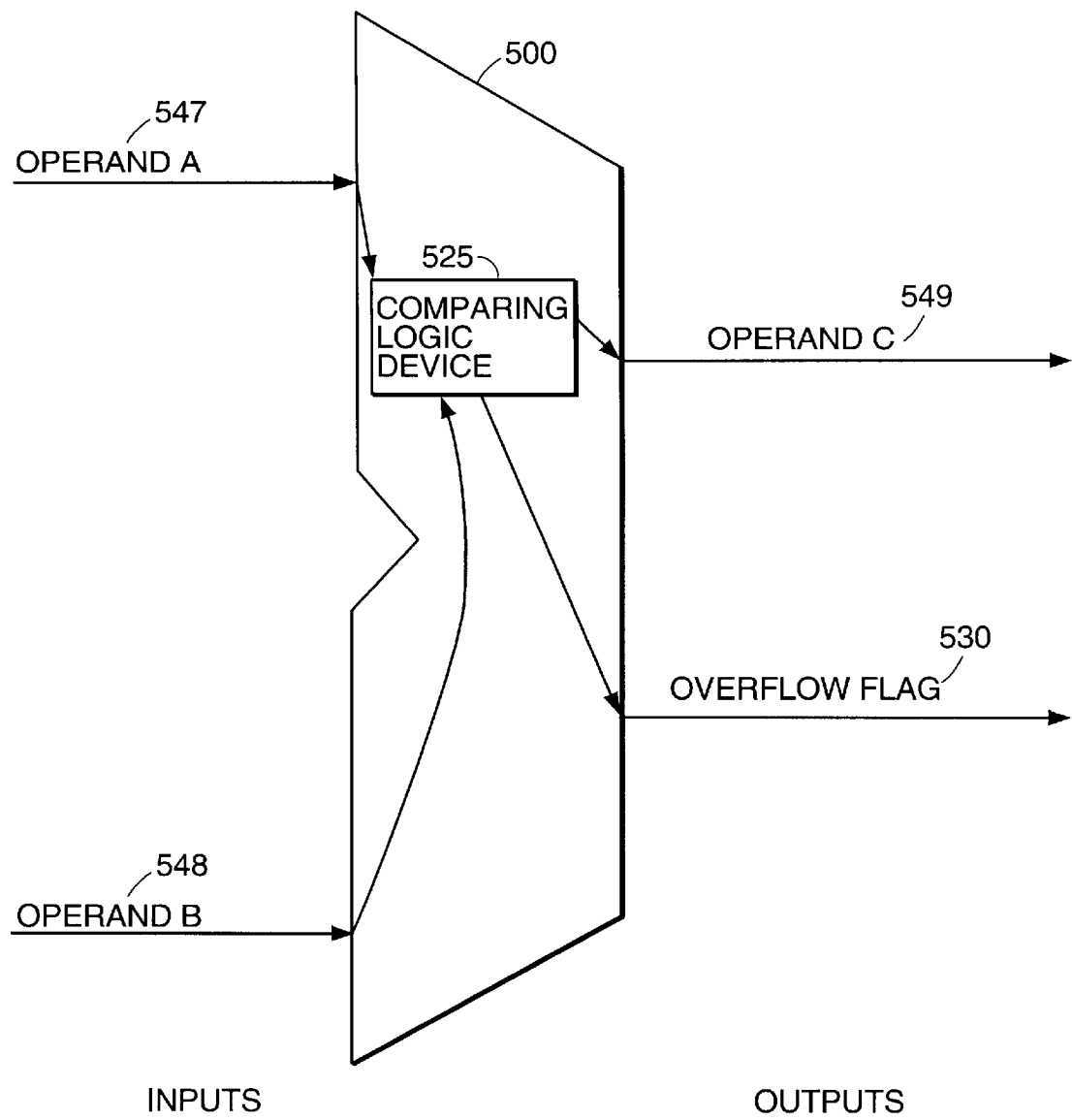
FIG. 13 is a diagram illustrating the inputs, outputs and processing of the partial compare and conditional move instruction Diagram.

FIG. 13 shows a representation of a "partial compare and conditional move" instruction as provided by this invention. Compressed string such as words are stored in the aforementioned trie data structure. The present instruction speeds up decompression of character strings that must be "unraveled" by traversing backward through the compressed string trie structure until the root node (i.e., the root letter of the string) has been found. Partial compare and conditional move circuitry in XALU 500 accepts two inputs; (i) a pointer to the next upward node in the trie (in relation to a node currently being pointed to) at Operand A 547, and (ii) a value representing the root node pointer at Operand B 548. The comparing logic device 525 for this instruction compares Operand A 547 and Operand B 548 and produces one of two possible results. First, if the two operands 547, 548 are equal the root node of the trie data structure has been found and an overflow flag 530 is set. Second, if Operand A 547 is not equal to Operand B 548, the pointer to the next upward node stored in Operand A 547 is copied to Operand C 549 and no flags are set. By providing an instruction for this operation, the invention provides a convenient tool for protocol program development. The instruction saves coding time, increases execution speed, and since it is callable only when needed, processor cycles and power are conserved. For more details on partial compare and conditional move see Section 4.9.5 in the provisional application formerly referenced.

Figure 14:
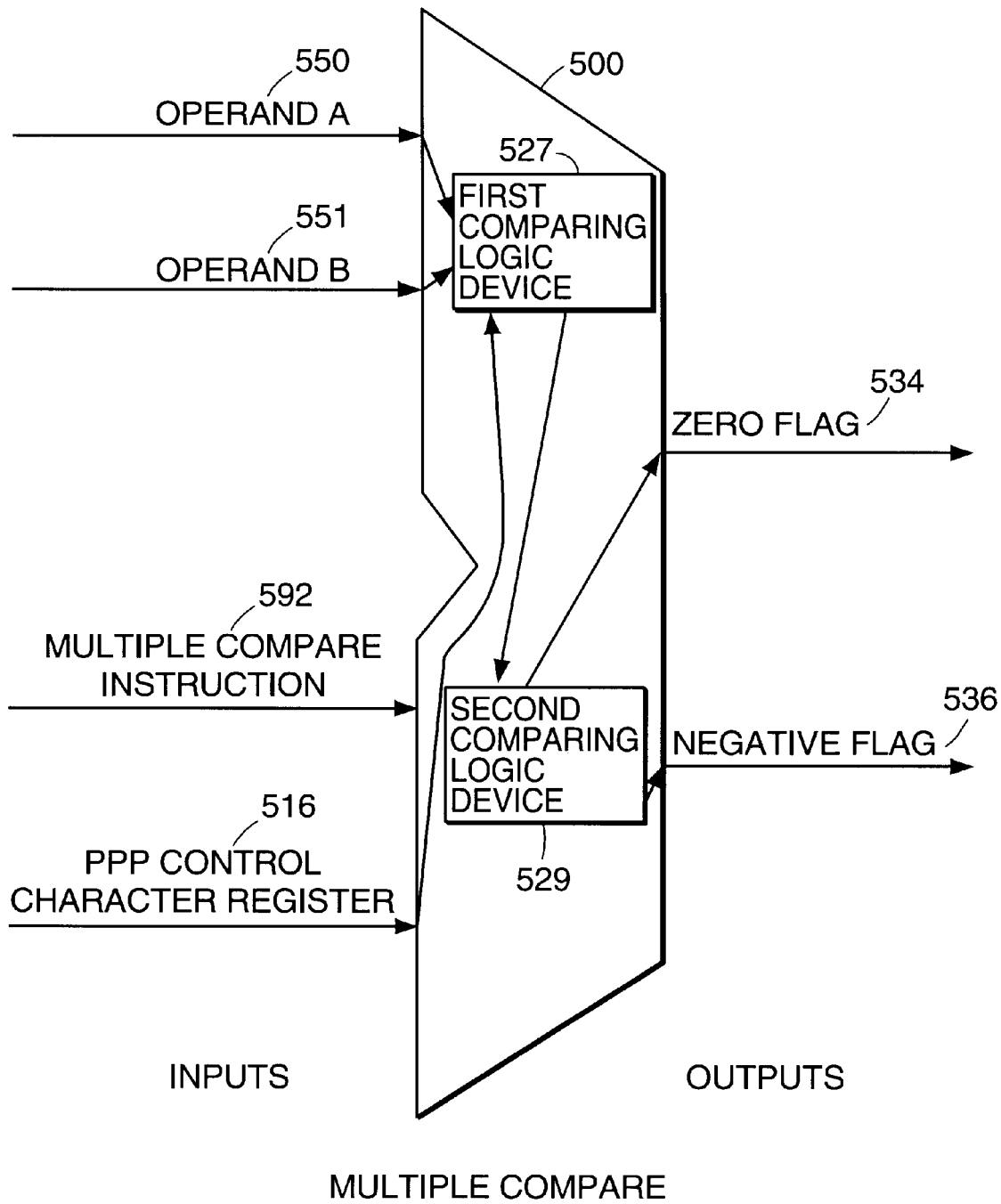
FIG. 14 is a diagram illustrating the inputs, outputs and processing of the multiple compare instruction Diagram.

Processing PPP/SLIP data communications protocols involves identifying and optionally removing special control characters in a data stream. The present invention provides a "multiple compare instruction" which performs this operation. FIG. 14 illustrates a representation of the multiple compare instruction 592 circuitry as provided by the present invention. The multiple compare instruction 592 is used to speed up PPP/SLIP processing by working in conjunction with the PPP Character Control Register 516, shown in FIG. 8. The instruction identifies special control characters which must be detected in data streams when processing PPP/SLIP data communications protocols.

The multiple compare instruction 592 circuitry represented by first and second comparing logic devices 527 and 529 in XALU 500 accepts an input character for comparison at Operand A 550, and accepts a bit mask representing a range of characters to be detected (e.g., 0x00 to 0x1F) at Operand B 551. Initially, the first comparing logic device 527 reads the PPP Character Control Register 516 shown in FIG. 8. If the first comparing logic device 527 detects characters in the PPP Character Control Register 516 shown in FIG. 8, the first comparing logic device 527 compares each character in the PPP Character Control Register 516 to the input character in Operand A 550. If a match is found, the first comparing logic device 527 indicates to the second comparing logic device 529 to set the zero flag 534 to indicate the input character in Operand A 550 matches at least one of the characters in the PPP Character Control Register 516 shown in FIG. 8. Next, the second comparing logic device 529 determines if the input character in Operand A 550 is a value less than 0x20. If so, the second comparing logic device 529 determines if each bit position represented in the input character in Operand A 550 is turned on (i.e., is a "1") in the mask representing a range of characters to be detected in Operand B 551. If the bit positions match, negative flag 536 is set to indicate a match. This instruction provides a bit comparison algorithm in a single instruction which can speed protocol development and execution time. For more details on the multiple compare instruction 592 and associated register use, see Sections 4.9.6 and 4.3.16 in the provisional application formerly referenced.

Error detection and correction in data communications is essential in providing reliable messaging. Cyclic Redundancy Check ("CRC") is a common method of error detection in data communications. The present invention provides an extension instruction in XALU 500 to facilitate CRC calculations for use in error detection.

Figure 15:
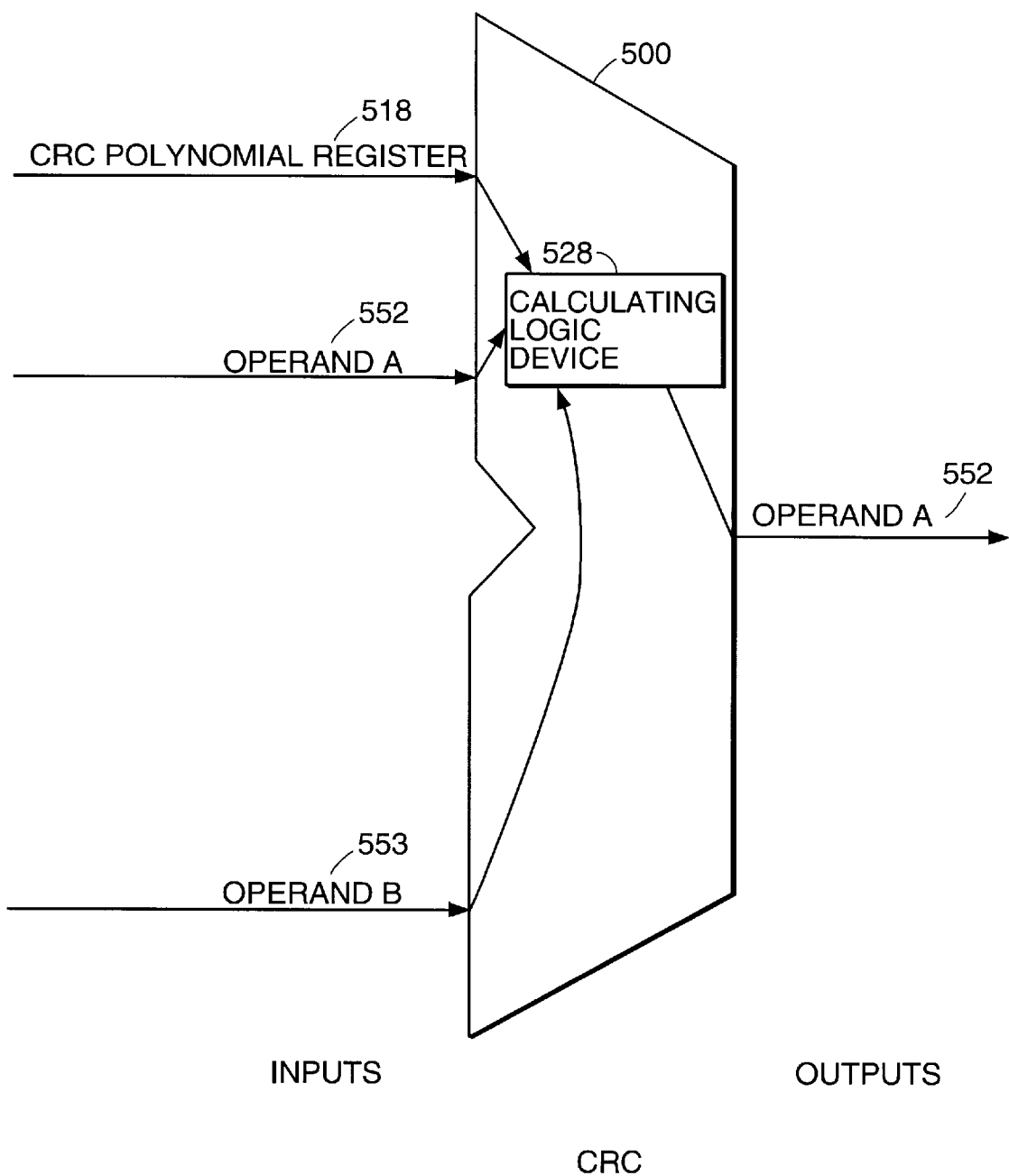
FIG. 15 is a diagram illustrating the inputs, outputs and processing of the CRC instruction Diagram.

FIG. 15 shows a representation of the CRC instruction circuitry as provided by the present invention. This instruction uses a calculating logic device circuit 528 which works in conjunction with the CRC Register 518, shown in FIG. 9. This register is used to specify the polynomial used in the CRC calculation. For more details on this register see Section 4.3.11 in the provisional application formerly referenced. The CRC instruction uses calculating logic device 528 to accept three inputs; (i) a state of a previous CRC calculation as Operand A 552, (ii) the next byte to be shifted into the polynomial at Operand B 553, and (iii) the polynomial used to compute the CRC at CRC polynomial register 518. The calculating logic unit 528 computes a new CRC based on these inputs and stores the result as Operand A 552. By offering an instruction to computer a CRC value, the invention eliminated the need to write program code to perform this operation. Furthermore, the instruction is called only when needed, and thus CRC circuitry is not activated at all times, thus conserving processing power. For more details on the CRC instruction see Section 4.9.1 in the provisional application formerly referenced.

The previously described embodiments of the invention provide a set of additional extension instructions that may be used to write communications programs that execute on processors 110 and/or 210 in co-processor 100. The communications programs implement protocols that operate on data. The extension instructions in XALU 500 provide features that improve performance of protocol operation. Moreover, since the co-processor can execute multiple protocols concurrently on both processors 110, 210, high data throughput rates are achieved. This allows co-processor 100 to operate on many streams or session of data. For example, in one embodiment, a single co-processor 100 can operate on up to 30 different streams or sessions of data. Each of these streams can have multiple protocols executing on packets for that stream. This processing is off-loaded form the CPU of the host computer.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A processor comprising:
   a first input receiving a first input data, a second input receiving a second input data, a third input receiving a third input data and a multiple compare instruction;
   a logic unit coupled to the first input, the second input, the third input and the multiple compare instruction, the logic unit including activatible multiple comparing circuitry which is activated upon receipt of the multiple compare instruction and which performs a comparison between the first input data and a series of predefined characters in the third input data, if the comparison results in the first input data being equal to any character in the series of predefined characters then a character match state is set;
   a second logic unit coupled to the input, the second logic unit including activatible multiple comparing circuitry which is activated upon receipt of the multiple compare instruction and performs a comparison between the first input data and a predefined boundary, if the first input data is within the predefined boundary then a character boundary state is set if a mask bit in the second input data, at a position equal to the value in the first input data, is set on;
   an output coupled to both the logic unit and the second logic unit, the output outputting the character match state and the character boundary state information; and
   wherein the processor can be reprogrammed to execute a different one of many possible instructions.

2. The processor of claim 1 wherein the multiple compare instruction executes on the logic unit as part of a protocol to perform compression on the data.

3. The processor of claim 1 wherein the multiple compare instruction executes on the logic unit as part of a protocol to perform decompression on the data.

4. The processor of claim 1 wherein the multiple compare instruction executes on the logic unit as part of a protocol to perform encryption on the data.

5. The processor of claim 1 wherein the multiple compare instruction executes on the logic unit as part of a protocol to perform decryption on the data.

6. An apparatus comprising a computer readable medium having a multiple compare instruction recorded thereon, the multiple compare instruction comprising:
   a first input receiving a first input data, a second input receiving a second input data, a third input receiving a third input data and a multiple compare instruction;
   a logic unit coupled to the first input, the second input, the third input and the multiple compare instruction, the logic unit including activatible multiple comparing circuitry which is activated upon receipt of the multiple compare instruction and which performs a comparison between the first input data and a series of predefined characters in the third input data, if the comparison results in the first input data being equal to any character in the series of predefined characters then a character match state is set;
   a second logic unit coupled to the input, the second logic unit including activatible multiple comparing circuitry which is activated upon receipt of the multiple compare instruction and performs a comparison between the first input data and a predefined boundary, if the first input data is within the predefined boundary then a character boundary state is set if a mask bit in the second input data, at a position equal to the value in the first input data, is set on;
   an output coupled to both the logic unit and the second logic unit, the output outputting the character match state and the character boundary state information; and
   wherein the processor can be reprogrammed to execute a different one of many possible instructions.

7. A method of processing data in a processor comprising the steps of:
   coupling a first input data, a second input data, a third input data and a multiple compare instruction to a first logic unit and a second logic unit;
   activating multiple comparing circuitry in the first logic unit upon receipt of the multiple compare instruction; comparing the first input data and a series of predefined characters in the third input data; if the comparison results in the first input data being equal to any character in the series of predefined characters then setting a character match state;
   activating multiple comparing circuitry in the second logic unit upon receipt of the multiple compare instruction; comparing the first input data with a predefined boundary; if the first input data is within the predefined boundary then setting a character boundary state if a mask bit in the second input data, at a position equal to the value in the first input data, is set on;
   outputting the character match state and the character boundary state; and
   reprogramming the processor to execute one of many possible different instructions.

8. The processor of claim 7 wherein the multiple compare instruction executes on the logic units as part of a protocol to perform compression on the data.

9. The processor of claim 7 wherein the multiple compare instruction executes on the logic units as part of a protocol to perform decompression on the data.

10. The processor of claim 7 wherein the multiple compare instruction executes on the logic unit as part of a protocol to perform encryption on the data.

11. The processor of claim 7 wherein the multiple compare instruction executes on the logic unit as part of a protocol to perform decryption on the data.

* * * * *

UNITED STATES PATENT AND TRADEMARK OFFICE
CERTIFICATE OF CORRECTION

PATENT NO. : 6,032,253
DATED : Feb. 29, 2000
INVENTOR(S) : John D. Cashman, Paul M. Riley, Raymond G. Bahr, Wei Ye and Leo Goyette It is certified that error appears in the above-identified patent and that said Letters Patent is hereby corrected as shown below:

On the front page of the patent under "[75] Inventors:" insert --Leo Goyette, Bedford, Mass.--

Signed and Sealed this

Eighth Day of May, 2001

Attest:

NICHOLAS P. GODICI

Attesting Officer *Acting Director of the United States Patent and Trademark Office*

UNITED STATES PATENT AND TRADEMARK OFFICE
CERTIFICATE OF CORRECTION

PATENT NO. : 6,032,253                                                       Page 1 of 1
DATED : February 29, 2000
INVENTOR(S) : John D. Cashman, Paul M. Riley, Raymond G. Bahr, Wei Ye, Leo Goyette and Bruce P. Osler It is certified that error appears in the above-identified patent and that said Letters Patent is hereby corrected as shown below:

Line [75]: Add Leo Goyette as an inventor.

Signed and Sealed this

Twenty-fifth Day of September, 2001

*Attest:*

NICHOLAS P. GODICI
*Attesting Officer*      *Acting Director of the United States Patent and Trademark Office*

UNITED STATES PATENT AND TRADEMARK OFFICE
Certificate

Patent No. 6,032,253            Patented: February 29, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: John D. Cashman, Boxborough, MA; Paul M. Riley, Nashua, NH; Raymond G. Bahr, Natick, MA; Wei Ye, Westford, MA; Leo Goyette, Bedford, MA; and Bruce P. Osler, Hudson, NH.

Signed and Sealed this Twenty-Sixth Day of November 2002.

JOHN FOLLANSBEE
*Supervisory Patent Examiner*
Art Unit 2127